(12) United States Patent
Seto

(10) Patent No.: US 7,231,581 B2
(45) Date of Patent: Jun. 12, 2007

(54) COMMUNICATING USING A PARTIAL BLOCK IN A FRAME

(75) Inventor: Pak-Lung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 561 days.

(21) Appl. No.: 10/750,282

(22) Filed: Dec. 31, 2003

(65) Prior Publication Data

US 2005/0144548 A1 Jun. 30, 2005

(51) Int. Cl.
*H03M 13/00* (2006.01)
*G06F 11/10* (2006.01)

(52) U.S. Cl. ...................... 714/766; 714/807
(58) Field of Classification Search ............... 714/758, 714/766
See application file for complete search history.

(56) References Cited

U.S. PATENT DOCUMENTS

| 6,324,669 | B1 * | 11/2001 | Westby ................ 714/805 |
| 6,647,528 | B1 | 11/2003 | Collette et al. |
| 6,912,683 | B2 * | 6/2005 | Rifaat et al. ............ 714/774 |
| 6,964,008 | B1 * | 11/2005 | Van Meter, III .......... 714/807 |
| 6,988,235 | B2 | 1/2006 | Brown |

FOREIGN PATENT DOCUMENTS

WO WO-2005/066810 A2 7/2005
WO WO-2005/066810 A3 7/2005

OTHER PUBLICATIONS

American National Standard for Information Technology- Fibre Channel- Physical and Signalling Interface-3 (FC-PH-3), Developed by incits, Where IT all Begins, Table of Contents, (1998),6 pgs.
End-to-End Data Protection: 4.5 Protection Information Model (new section), T10/03-176 Revision 9, (Oct. 22, 2003), 42 pgs.
Frame-based ATM Transport over Ethernet (FATE), The ATM Forum Technical Committee, AF-FBATM-0139.001, (Jul. 2002), 11 pgs.
PCI Express Base Specification Revision 1.0, PCI Express, Table of Contents, (Jul. 22, 2002), 15 pgs.
PCI-X Addendum to the PCI Local Bus Specification, Revision 1.0a, Table of Contents, (Jul. 24, 2000),9 pgs.
Serial ATA: High Speed Serialized AT Attachment, Serial ATA Workgroup, Revision 1.0, Table of Contents, APT Technologies, Inc., (Aug. 29, 2001), 10 pgs.

(Continued)

*Primary Examiner*—Shelly Chase
(74) *Attorney, Agent, or Firm*—Grossman, Tucker, Perreault & Pfleger, PLLC

(57) ABSTRACT

A method according to one embodiment may include: at least one of transmitting and receiving a first portion of a first protected data block within a first frame; and at least one of transmitting and receiving a second portion of the first protected data block within a second frame. Of course, many alternatives, variations, and modifications are possible without departing from this embodiment.

24 Claims, 6 Drawing Sheets

OTHER PUBLICATIONS

Working Draft American National Standard, Project T10/1601-D, Revision 1, Table of Contents, Information Technology- Serial Attached SCSI-1.1 (SAS-1.1),(Sep. 18, 2003),24 pgs.

Satran, Julian , et al., "iSCSI", IP Storage Working Group, Internet Draft, (Jan. 19, 2003),9 pgs.

*International Search Report and Written Opinion of the International Searching Authority*, dated Aug. 10 2005; PCT/US2004/043370; 14 Pages.

Kumar, M., "Fibre Channel Classes of Service for Data Transport", *Brocade Communications Systems, Inc.*, Internet, http://www.brocadehongkong.com/download/resource/classofservice.pdf,(1997).

* cited by examiner

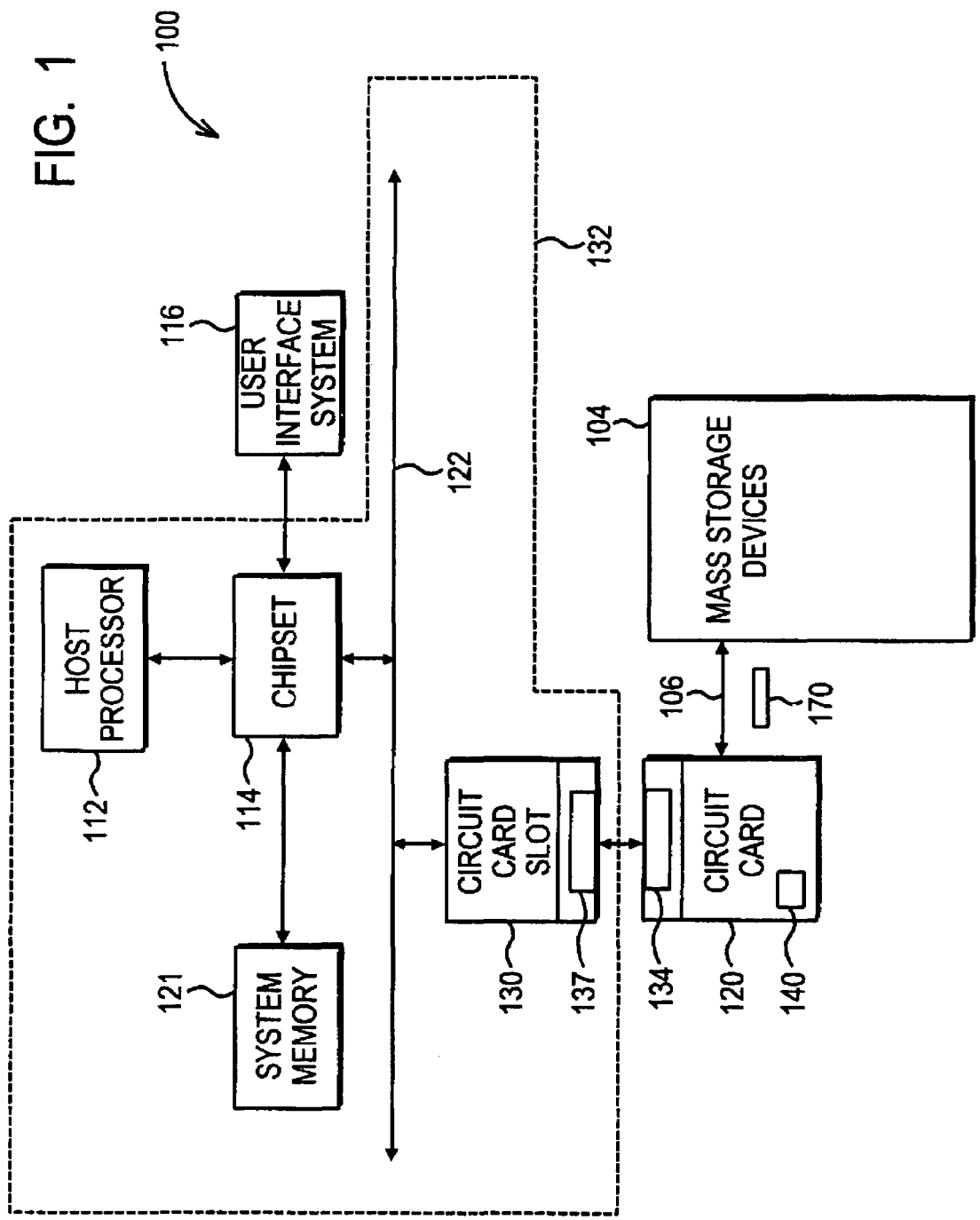

COMMUNICATING USING A PARTIAL BLOCK IN A FRAME

FIELD

This disclosure relates to communicating using a partial block in a frame.

BACKGROUND

Various communication protocols are known for communicating between a sending device and a receiving device. Typically, the communication protocol in a data storage system defines a maximum frame size and various data blocks are transmitted within these frames between the sending device and receiving device. An integer number of data blocks are typically transmitted within each frame and in some instances this may be accomplished with relatively little unused space in the frame.

However, as frame sizes change and/or the size of data blocks change, limiting the number of data blocks within a frame to an integer number may result in an increasing amount of unused space in the data frame. Hence, this results in a reduced utilization of the frame and increased system latency.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 1 is a diagram of a system consistent with one embodiment of the invention;

DETAILED DESCRIPTION

Figure 2A:
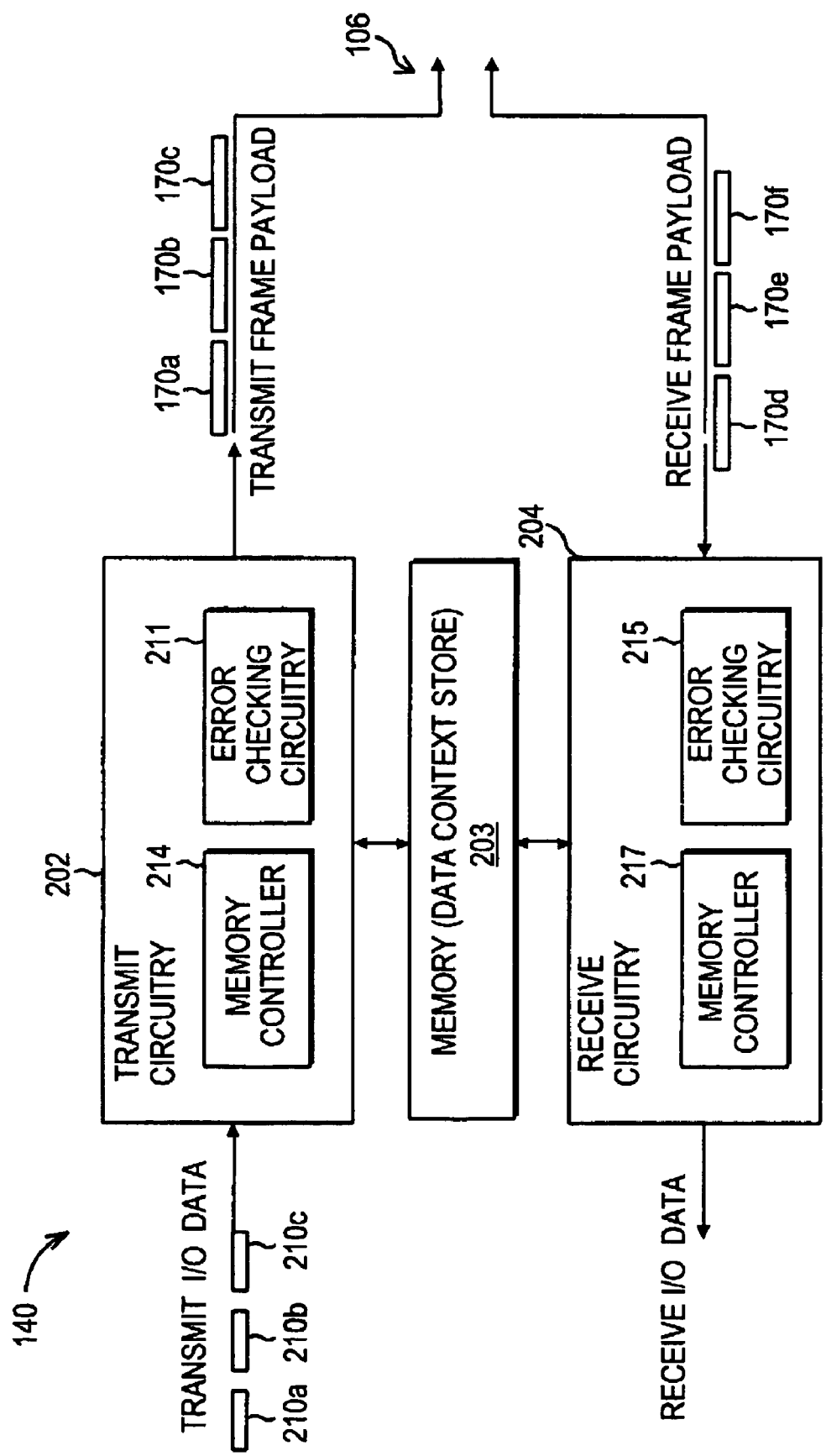
FIG. 2A is a diagram of partial block communication circuitry that may be included in a circuit card comprised in the system of FIG. 1.

FIG. 1 illustrates a system 100 consistent with an embodiment of the invention including a computer node having a host bus adapter (HBA), e.g., circuit card 120. The circuit card 120 is capable of communicating with one or more mass storage devices 104 via one or more communication links 106 using one or more communication protocols. Such communication may take place by transmission of frames having at least one data block. As further detailed herein in operation of the system 100, one frame may contain a portion of a data block while another frame may contain another portion of the same data block. As such, in system 100, utilization of the frames may be more efficient, and system latency may be decreased, compared to the prior art.

The system 100 may also generally include a host processor 112, a bus 122, a user interface system 116, a chipset 114, system memory 121, a circuit card slot 130, and a circuit card 120 capable of communicating with one or more mass storage devices 104. The host processor 112 may include one or more processors known in the art such as an Intel® Pentium® IV processor commercially available from the Assignee of the subject application. The bus 122 may include various bus types to transfer data and commands. For instance, the bus 122 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 122 may alternatively comply with the PCI-X Specification Rev. 1.0a, Jul. 24, 2000, available from the aforesaid PCI Special Interest Group, Portland, Oreg., U.S.A. (hereinafter referred to as a "PCI-X bus").

The user interface 116 may include one or more devices for a human user to input commands and/or data and/or to monitor the system 100 such as, for example, a keyboard, pointing device, and/or video display. The chipset 114 may include a host bridge/hub system (not shown) that couples the processor 112, system memory 121, and user interface system 116 to each other and to the bus 122. Chipset 114 may include one or more integrated circuit chips, such as those selected from integrated circuit chipsets commercially available from the Assignee of the subject application (e.g., graphics memory and input/output (I/O) controller hub chipsets), although other integrated circuit chips may also, or alternatively be used. The processor 112, system memory 121, chipset 114, bus 122, and circuit card slot 130 may be on one circuit board 132 such as a system motherboard.

The circuit card 120 may be constructed to permit it to be inserted into the circuit card slot 130. When the circuit card 120 is properly inserted into the slot 130, connectors 134 and 137 become electrically and mechanically coupled to each other. When connectors 134 and 137 are so coupled to each other, the circuit card 120 becomes electrically coupled to bus 122 and may exchange data and/or commands with system memory 121, host processor 112, and/or user interface system 116 via bus 122 and chipset 114.

Alternatively, without departing from this embodiment, the operative circuitry of the circuit card 120 may be included in other structures, systems, and/or devices. These other structures, systems, and/or devices may be, for example, in the motherboard 132, and coupled to the bus 122 or in a chipset, e.g., chipset 114.

The circuit card 120 may communicate with the mass storage device 104 via one or more communication links 106 using one or more communication protocols. A plurality of frames 170 may be transmitted over the communication link 106. A "frame" as used herein may comprise one or more symbols and values. A large number of frames from different devices such as mass storage devices and HBAs may be transmitted over communication links 106. The mass storage device 104 may include one or more mass storage devices, e.g., one or more redundant array of independent disks (RAID) 185 and/or peripheral devices. Exemplary communication protocols may include Fibre Channel (FC), Serial Advanced Technology Attachment (S-ATA), Serial Attached Small Computer Systems Interface (SAS) protocol, internet Small Computer System Interface (iSCSI), and/or asynchronous transfer mode (ATM).

If a FC protocol is used by circuit card 120 to exchange data and/or commands with the mass storage device 104, it may comply or be compatible with the interface/protocol described in ANSI Standard Fibre Channel (FC) Physical and Signaling Interface-3 X3.303:1998 Specification. Alternatively, if a S-ATA protocol is used by circuit card 120 to exchange data and/or commands with mass storage 104, it may comply or be compatible with the protocol described in "Serial ATA: High Speed Serialized AT Attachment," Revision 1.0, published on Aug. 29, 2001 by the Serial ATA Working Group. Further alternatively, if a SAS protocol is used by circuit card 120 to exchange data and/or commands with mass storage 104, it may comply or be compatible with the protocol described in "Information Technology—Serial Attached SCSI-1.1 (SAS)," Working Draft American National Standard of International Committee For Information Technology Standards (INCITS) T10 Technical Committee, Project T10/1562-D, Revision 1, published Sep. 18, 2003, by American National Standards Institute (hereinafter termed the "SAS Standard") and/or later-published versions of the SAS Standard. Further alternatively, if an iSCSI protocol is used by circuit card 120 to exchange data and/or commands with mass storage 104, it may comply or be compatible with the protocol described in "IP Storage Working Group, Internet Draft, draft-itef-ips-iscsi-20.txt", published Jan. 13, 2003 by the Internet Engineering Task Force (ITEF) and/or later published versions of the same. Further alternatively, if an ATM protocol is used by circuit card 120 to exchange data and/or commands with mass storage 104, it may comply or be compatible with the plurality of ATM Standards approved by the ATM Forum including, for example, "Frame Based ATM Transport over Ethernet" published July, 2002 by the ATM Forum.

FIG. 2A is a diagram of communication circuitry 140 consistent with one embodiment of the invention that may be included on the circuit card 120 of FIG. 1. Alternatively, the circuitry 140 may be included in other structures and systems, e.g., in the motherboard 132 and coupled to the bus 122, such as, for example, in the chipset 114 and/or in other devices. As used herein, "circuitry" may comprise, for example, singly or in any combination, hardwired circuitry, programmable circuitry, state machine circuitry, and/or firmware that stores instructions executed by programmable circuitry.

The communication circuitry 140 may generally include transmit circuitry 202, receive circuitry 204, and memory 203. Other communication circuitry 140 may be for transmit only devices and hence have only the transmit circuitry 202, or may be for receive only devices and hence have only the receive circuitry 204. The memory 203 may include one or more machine readable media such as random-access memory (RAM), dynamic RAM (DRAM), magnetic disk (e.g. floppy disk and hard drive) memory, optical disk (e.g. CD-ROM) memory, and/or any other device that can store information. The memory 203 may be comprised in circuitry 140 or on other circuitry in the circuit card 120 or/or elsewhere in the system 100. The transmit circuitry 202 and receive circuitry 204 are shown as sharing memory 203, however, each circuitry 202, 204 may also have its own separate memory.

In general, transmit circuitry 202 may accept one or more data blocks 210*a*, 210*b*, 210*c* from other circuitry and insert one or more data blocks within one or more frames 170*a*, 170*b*, 170*c* as further detailed herein. As used herein, a "data block" may comprise a predetermined fixed size unit comprising a sequence of one or more symbols and values. In doing so, one portion of one data block, e.g., block 210*a*, may be inserted in one frame, e.g., frame 170*a*, while another portion of the same data block may be positioned in another frame, e.g., frame 170*b*. Therefore, efficiency of utilization of the frames in system 100 may be improved compared to the prior art wherein each data frame includes only a whole number of data blocks. Similarly, in general receive circuitry 204 may accept one or more frames 170*d*, 170*e*, 170*f* from the communication link 106 where at least one frame has a portion of a data block and another frame has another portion of the same data block. To handle a partial data block within a frame, both the transmit 202 and receive 204 circuitry generally direct saving and retrieving of context data relating to the segmentation of the data block as is further detailed herein.

Figure 2B:
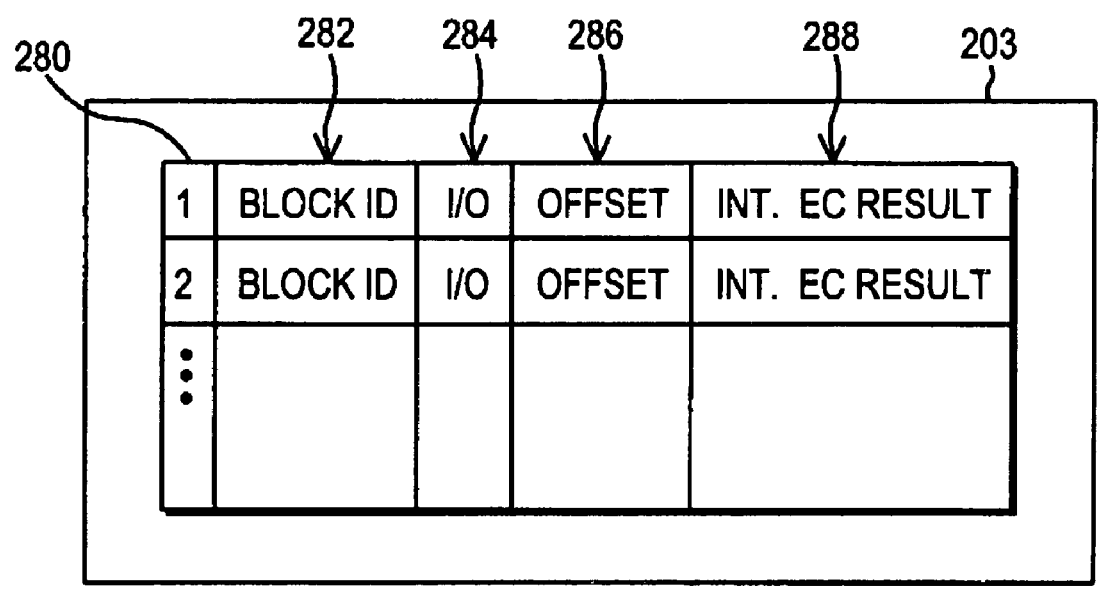
FIG. 2B is an exemplary table that may be in stored in memory comprised in the circuitry of FIG. 2A.

An exemplary table 280 of context data that may be stored in memory 203 is illustrated in FIG. 2B. The table 280 may include various context data, including, but not limited to, a data block identification portion 282, an I/O device identifying portion 284, and an offset portion 286 representative of the segmentation point between a first portion of data from a data block in one frame and a second portion of data from the same data block in another frame. The table 280 may also include an intermediate error checking calculation result 288. The various exemplary portions 282, 284, 286, 288 of context data will be explained in more detail relative to FIG. 3A.

Figures 3A, 3B:
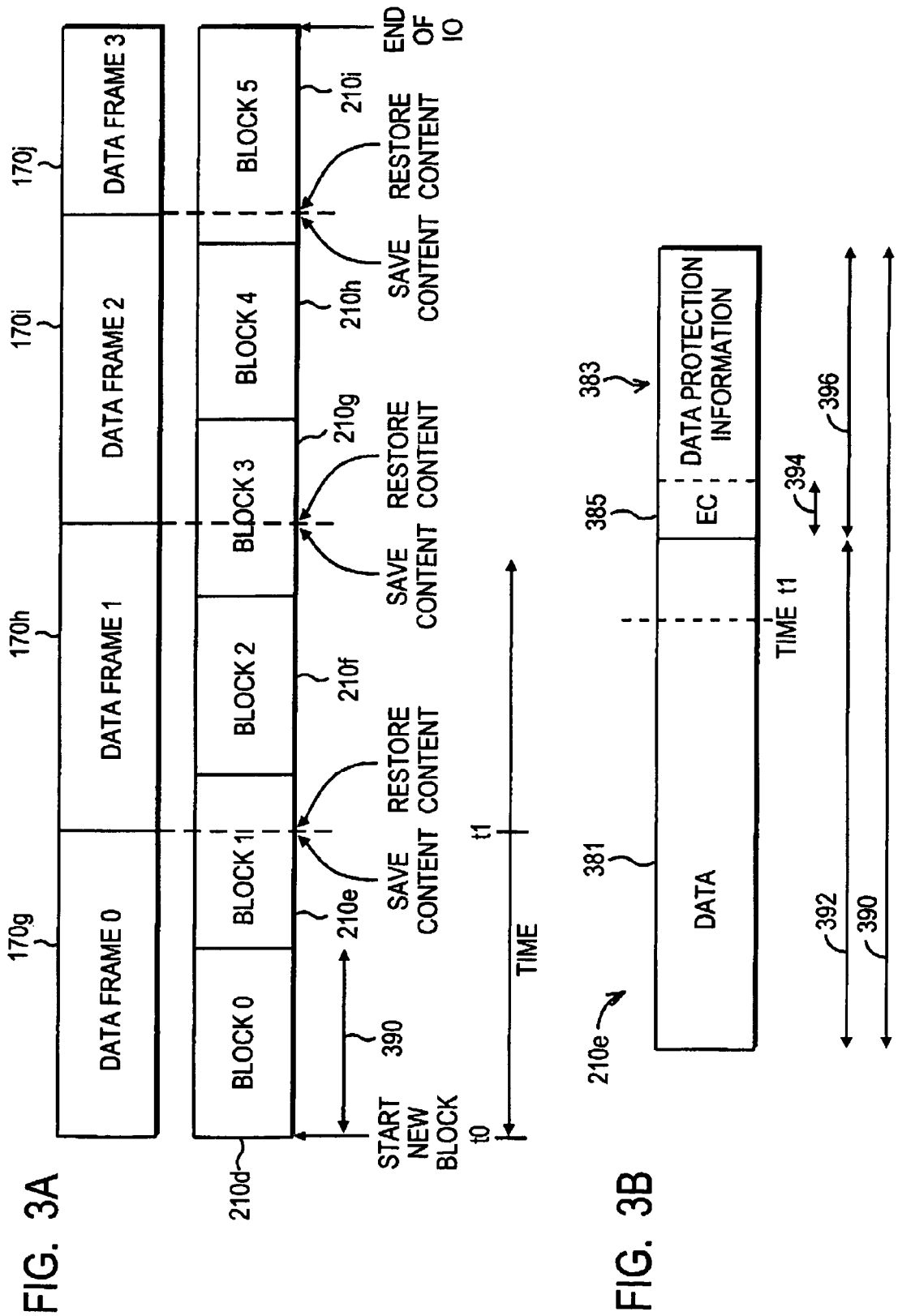
FIG. 3A is a diagram of an exemplary sequence of data blocks inserted into associated frames where the size of a data block is less than a frame.
FIG. 3B is a diagram of an exemplary protected data block of the sequence of FIG. 3A.

FIG. 3A illustrates an exemplary sequence of frames 170*g*, 170*h*, 170*i*, 170*j* that may either be transmitted or received by the respective transmit and receive circuitry 202, 204 of FIG. 2A. Advantageously, the four frames 170*g*, 170*h*, 170*i*, 170*j* include six data blocks 210*d*, 210*e*, 210*f*, 210*g*, 210*h*, 210*i* for improved utilization of space within the frames. FIG. 3B illustrates in greater detail the exemplary data block 210*e* where a first portion of the data block 210*e* is in the first frame 170*g* and a second portion, in this case a remaining portion, is in the second frame 170*h*.

As illustrated in FIG. 3B, the exemplary data block 210*e* may be a protected data block. As used herein, a "protected data block" includes a data block having a data protection portion that may facilitate checking for one or more errors in the data block. In the embodiment as detailed in FIG. 3B, the exemplary protected data block 210*e* has a data portion 381 and a data protection portion 383 for facilitating checking for errors in the data portion 381. The data portion 381 may comprise a plurality of bytes of data to be transmitted between a transmitting device and receiving device. The protected data block 210*e* may have a size 390, e.g., about 524 bytes in one embodiment, of which the data portion 381 has a size 392, e.g., about 516 bytes in one embodiment, and the data protection portion 383 has a size 396, e.g., about 8 bytes in one embodiment. The data protection portion 383 may include an error checking portion 385, e.g., a block guard portion, having a size 394 and other data protection tools such as an incrementing logical block address (LBA) tag and an application defined tag.

The error checking portion 385 may include one or more error checking codes based upon which the integrity of the data transmitted between a sending and receiving device may be checked and verified. For example, the transmit circuit 202 may have error checking circuitry 211 to calculate and append an error checking code in the error checking portion 385. Exemplary error checking circuitry may utilize a cyclic redundancy checking engine to apply a 16 bit polynomial calculation to the data portion 381 that is being transmitted to derive a cyclic redundancy code (CRC), e.g., a two-byte CRC.

The receiving device may also have error checking circuitry 215 in the receive circuitry 204 that applies the same polynomial calculation to the data portion of the data received and may compare the result of the other calculation with the CRC code appended by the sending device. If the appended code and the result match, then the data in the data portion 381 is determined by circuitry 215 to have been sent successfully. If they do not agree, circuitry 215 may signal the sending device that an error in transmission has occurred and may request that the data be resent. The data protection portion 383 may comply or be compatible with, for example, the data protection techniques disclosed in "4.5 Protection Information Model (new section)," T10/03-176 revision 9, End-to-End Data Protection Document published by T10, a Technical Committee of Accredited Standards Committee INCITS (International Committee for Information Technology Standards) on Oct. 22, 2003 ("the Model") and/or other and/or later developed versions of the Model.

Being able to place a portion of a data block within one frame and another portion of the same data block within another frame, in accordance with this embodiment, enables efficiency of utilization of the frames to be increased compared to the prior art. Again, to handle partial distribution of data blocks within frames, both the transmit 202 and receive 204 circuitry may direct saving and retrieving of context data relating to the segmentation of the data block in the frames as is further detailed herein.

For instance, at the end of the transmission or reception of the first frame 170g, e.g., time t1, the context data for the second data block 210e may be stored in memory 203, e.g., in the exemplary table 280. In general, the context data may include identification information for the second data block 210e, an indication of where the protected data block 210e was segmented (e.g., a relative offset value indicating the last byte of the data block 210e to be transmitted or received), and an intermediate error checking result associated with that portion of the data from the data block 210e transmitted or received in that frame 117g. Such information may be stored in the data block identification portion 282, the offset portion 286, and the intermediate error checking result portion 288 of the exemplary table 280 illustrated in FIG. 2B.

In operation, the transmit circuitry 202 receives one or more data blocks. The transmit circuitry 203 may then transmit one or more partial data blocks in an associated frame payload. For instance, a portion of the second data block 210e of FIG. 3A may be transmitted in the first frame 170g. For such a partially transmitted data block 210e, transmit circuitry 202, e.g., via error checking circuitry 211, may perform an error checking calculation for the corresponding amount of transmitted bytes and develop an intermediate error checking calculation result. As used herein, an "intermediate error checking result" may comprise a calculated error checking result based, at least in part, on data received from one or more partially received protected data blocks. Also as used herein, a "final error checking result" may comprise, at least in part, a calculated error checking result based on data from an entire protected data block.

The transmit circuitry 202, e.g., using a memory controller 214, such as a direct memory access (DMA) controller, may then direct storage of the intermediate error checking result and the associated offset value in locations of memory 203. As used herein, an "offset value" may represent a last transmitted or received data bit of a transmitted or received, respectively, partial protected data block upon which an intermediate error checking result is, at least in part, based. These values may then be stored in the intermediate error checking result portion 288 and the offset portion 286 of the exemplary table 280. The memory address location may also contain identifying data for the partially transmitted data block 210e. This may be stored in the block identification portion 282 of the exemplary table 280.

When the next frame 170h containing the remainder of the block 210e is transmitted, the context data for the partially transmitted block 210e may be restored by the transmit circuitry 202. This may include the intermediate error checking result and associated offset. The transmit circuitry 202, e.g., via the error checking circuitry 211, may then continue with its error checking calculation using the restored intermediate error checking result as a seed value, to develop an error code, e.g., a CRC code, to append to an end of the data block 210e. A similar process continues at the end of each frame 117h, 117i to enable increased efficiency of utilization of the frame regardless of frame or data block size.

The receive circuitry 204 may operate in a similar fashion as the transmit circuitry 202. That is, the receive circuitry 204 may receive a frame payload that may contain a partial portion of a data block placed in an associated frame. For instance, the receive circuitry 204 may receive frame 170g having a portion of data block 210e. For such a partially received protected data block 210e, the receive circuit, e.g., using an error checking engine 215, performs an error checking calculation for the corresponding amount of received bytes and develops an intermediate error checking calculation result. The receive circuitry 204, e.g., using a memory controller 217 such as a DMA controller, may then direct storage of the intermediate result and the associated offset in a memory address location of memory 203. The memory address location may also contain identifying data for the partially transmitted protected data block 210e.

When the next frame 170h containing the remainder of the block 210e is received, the receive circuitry 204 may restore the stored context for data block 210e, e.g., using memory controller 217. The restored context may include the intermediate error checking result and associated offset corresponding to this result. The receive circuit, e.g., using error checking circuit 215, may then continue with its error checking calculation to develop an error code, e.g., a CRC code, to compare with the error checking code appended on the transmitting end. This process may continue at the end of each frame to enable increased efficiency of utilization of the frame regardless of frame or protected data block size.

Figure 4:
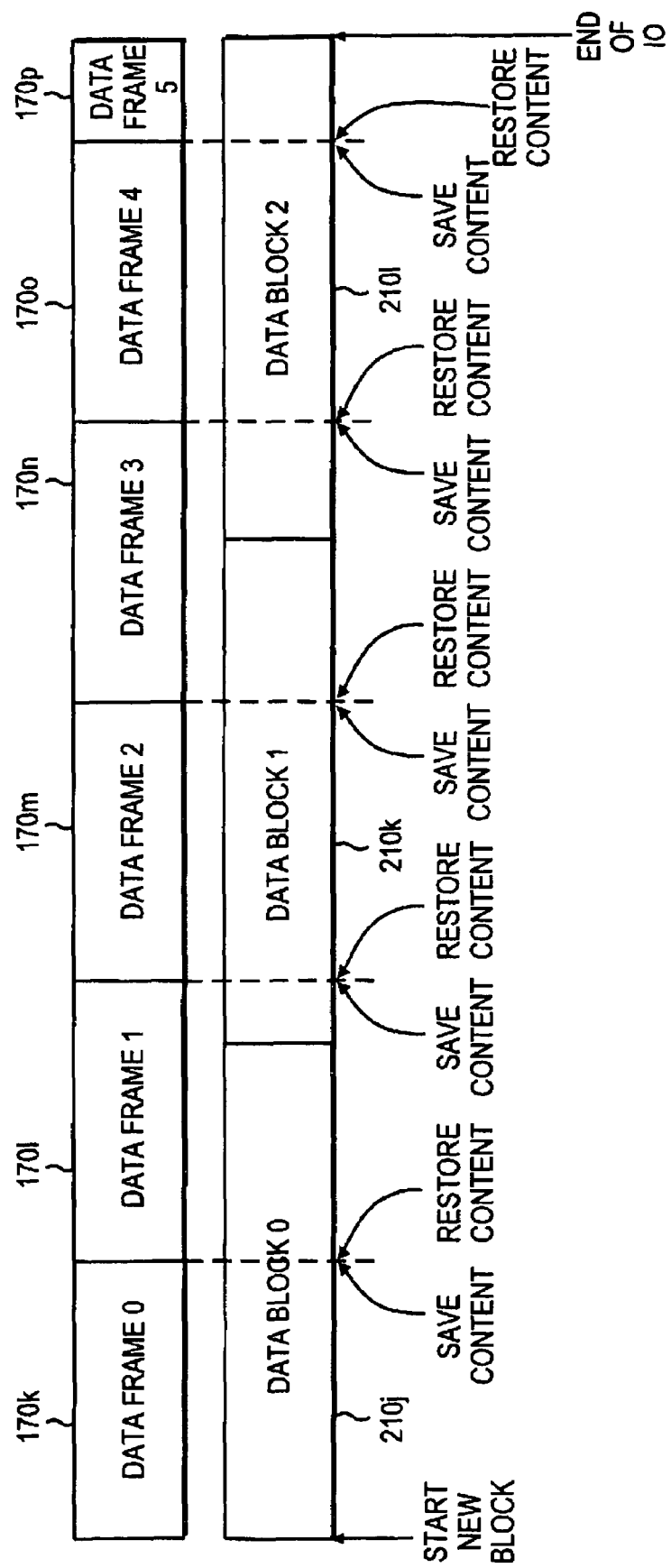
FIG. 4 is a diagram of another exemplary sequence of data blocks inserted into associated frames where the size of a data block is greater than a frame.

FIG. 4 is a diagram of another exemplary sequence of frames 170k, 170l, 170m, 170n, 170o, 170p that may either be transmitted or received by the respective transmit and receive circuitry 202, 204 of FIG. 2A. A plurality of data blocks 210j, 210k, 210l may be distributed in the frames 170k, 170l, 170m, 170n, 170o, 170p. In contrast to the sequence of FIG. 3A, the size of each of the frames 170k, 170l, 170m, 170n, 170o, 170p may be smaller than the size of the data blocks 210j, 210k, 210l.

Other than the relative size of the data blocks compared to the frames, the operation of transmitting and receiving such data blocks 210j, 210k, 210l in such frames 170k, 170l, 170m, 170n, 170o, 170p may be similar to the operations described with reference to FIG. 3A. That is, at the end of frame 170k, context data may be stored for protected data block 210j. This context data may include identification information for the data block 210j, an indication of where the protected data block 210j was separated (e.g., a relative offset value indicating which was the last byte of the protected data block 210j in the frame 170k), and the intermediate error checking calculation associated with such data. This saved context data may then be restored upon receipt of the remainder of the data from the data block 210j or at the start of the second frame 170l. This process may continue similarly frames 170k, 170l, 170m, 170n, 170o, 170p have been transmitted or received.

Figure 5:
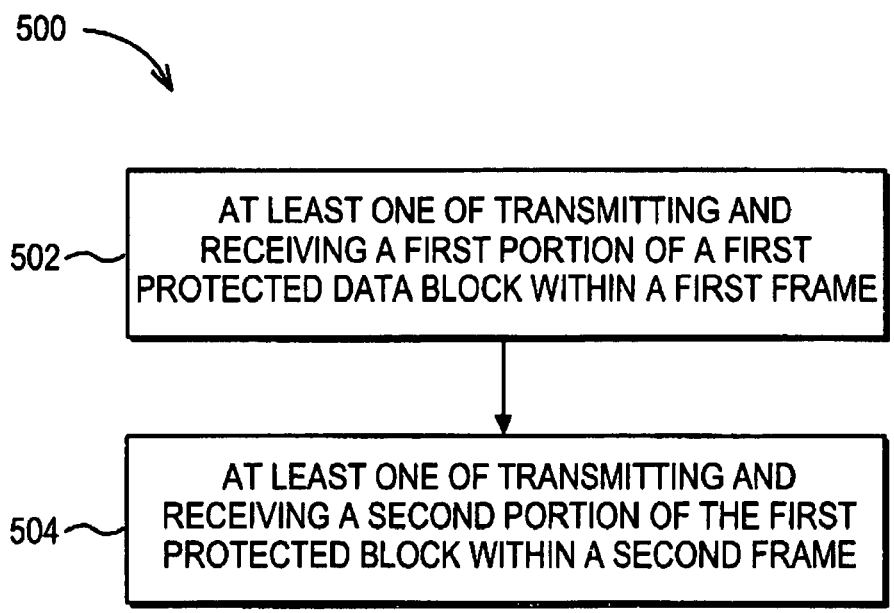
FIGS. 5–6 are flow charts illustrating operations consistent with embodiments.

FIG. 5 is a flow chart of exemplary transmission operations 500 consistent with an embodiment of the invention. In operation 502, at least one of transmitting and receiving a first portion of a first protected data block within a first frame is accomplished. For example, a first portion of the protected data block 210e may be transmitted or received within one frame 170g (see FIG. 3A). In operation 504, at least one of transmitting and receiving a second portion of the first protected data block within a second frame is accomplished. This second portion may include the remaining portion of the data block or there may be further portions of the data block in additional frames. For example, a second portion of block 210e, in this case a remaining portion may be transmitted or received in frame 170h.

Out of Order Frame Handling

Occasionally, the incoming frames of a particular flow may be received out of order or out of sequence. If the first out of order frame received has a new protected data block starting at the beginning of the out of order frame received, out of order frames may be processed without waiting for the missing frame from the sequence. For example, if a transmitted frame sequence comprising frames 0, 1, 2, 3, 4, and 5 was received as frames 0, 1, 3, 4, 5, and 2, the first out of order frame (frame 3) may be analyzed to determine if a new protected data block started at the start of frame 3. If so, then processing of the data blocks in frame 3, 4, and 5 would continue without waiting for the missing frame 2.

This can be accomplished by assigning a new error checking intermediate saving context location in memory 203 for the out of order frames, e.g., frames 3, 4, and 5 in the present example. When the missing frame, e.g., frame 2 is received, any partial data block and any associated intermediate error checking calculation result associated with the received portion of the first frame 1, may be utilized to continue or finish the error checking calculation associated with that protected data block. For instance, the first frame 1 may be similar to frame 170g and the second frame may be similar to frame 170h of FIG. 3A such that once frame 170h is received, the intermediate error checking calculation result from the portion of the protected data block 210e in frame 170g may be utilized to calculate a final error checking calculation result for protected data block 210e. As such, queing out of order frames may increase performance by enabling analysis of such out of order frames without waiting for receipt of a missing frame.

Figure 6:
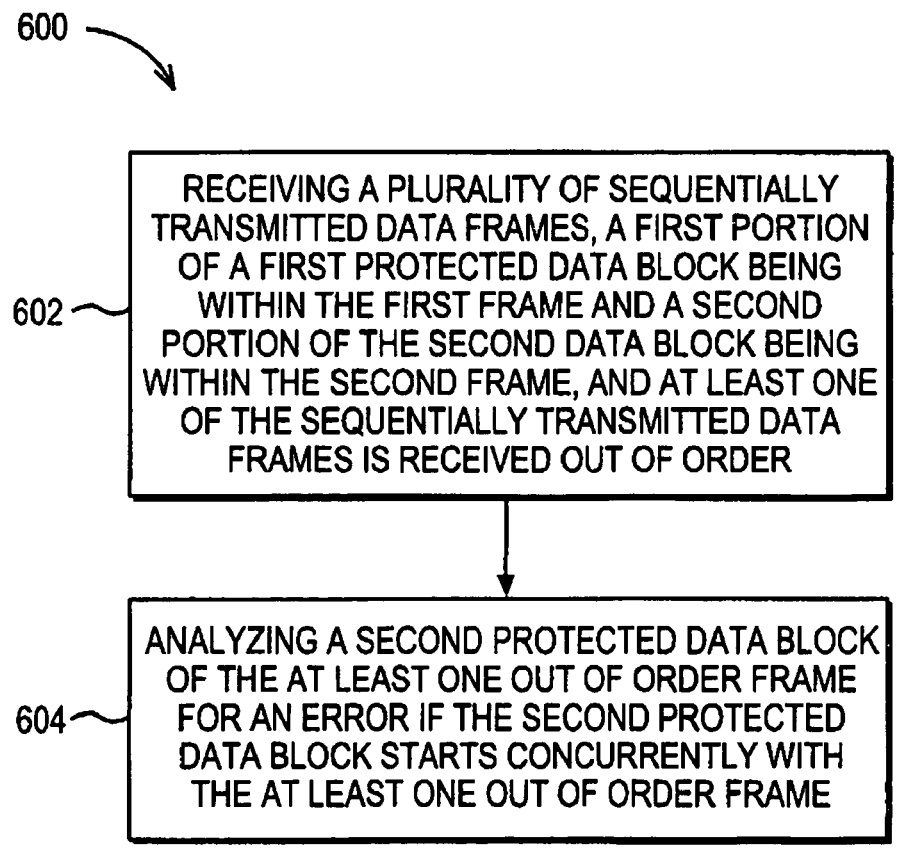

FIG. 6 is a flow chart of exemplary operations 600 of handling out of order frames consistent with an embodiment of the invention. The operations include receiving a plurality of sequentially transmitted frames including a first and second frame. A first portion of a first protected data block is received within the first frame and a second portion of the first protected data block is received within a second frame, and at least one of the sequentially transmitted frames is received out of order in operation 602. The operations 600 may also include analyzing a second protected block of the at least one out of order frame for an error if the second protected data block starts concurrently with the at least one out of order frame in operation 604.

It will be appreciated that the functionality described for all the embodiments described herein may be implemented using hardware, firmware, software, or a combination thereof. If implemented in software, instructions adapted to be executed by a machine may be stored on machine-readable media. Some examples of such machine-readable media include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g. floppy disk and hard drive), optical disk (e.g. CD-ROM), and any other device that can store information. In one embodiment, the instructions are stored on the medium in a compressed and/or encrypted format.

Thus, in summary one embodiment may comprise a method. The method may include at least one of transmitting and receiving a first portion of a first protected data block within a first frame; and at least one of transmitting and receiving a second portion of the first protected data block within a second frame.

There is also provided an article. The article may comprise a storage medium having stored thereon instructions that when executed by a machine result in the machine performing operations comprising: at least one of transmitting and receiving a first portion of a first protected data block within a first frame; and at least one of transmitting and receiving a second portion of the first protected data block within a second frame.

The embodiments that have been described herein are set forth here by way of illustration but not of limitation. It is obvious that many other embodiments, which will be readily apparent to those skilled in the art, may be made without departing from the spirit and scope of the appended claims.

What is claimed is:

1. A method comprising:
    at least one of transmitting and receiving a first portion of a first protected data block within a first frame;
    at least one of transmitting and receiving a second portion of said first protected data block within a second frame;
    calculating an intermediate error checking result based on data in said first portion of said first protected data block;
    saving said intermediate error checking result; and
    retrieving said intermediate error checking result at the start of said second frame.

2. The method of claim 1, wherein said first and second frame are in accordance with one of Serial Attached Small Computer System Interface (SAS) protocol and Fibre Channel protocol.

3. The method of claim 1, wherein said second portion comprises a remaining portion of said first protected block.

4. The method of claim 3, further comprising:
    calculating a final error checking result in response to, at least in part, said intermediate checking result and data in said remaining portion.

5. The method of claim 1, further comprising:
    saving an offset value representative of a last data bit of said first portion of said first protected data block; and
    continuing, based at least in part upon said offset value and said intermediate error checking result, with an error checking calculation.

6. An article comprising:
    a machine readable medium having stored thereon instructions that when executed by a machine result in the machine performing operations comprising:
    at least one of transmitting and receiving a first portion of a first protected data block within a first frame;
    at least one of transmitting and receiving a second portion of said first protected data block within a second frame;
    calculating an intermediate error checking result based on data in said first portion of said first protected data block;
    saving said intermediate error checking result; and retrieving said intermediate error checking result at the start of said second frame.

7. The article of claim 6, wherein said first and second frame are in accordance with one of Serial Attached Small Computer System Interface (SAS) protocol and Fibre Channel protocol.

8. The article of claim 6, wherein said second portion comprises a remaining portion of said first protected block.

9. The article of claim 8, wherein said operations further comprise:
calculating a final error checking result in response to, at least in part, said intermediate checking result and data in said remaining portion.

10. The article of claim 6, wherein said operations further comprise:
saving an offset value representative of a last data bit of said first portion of said first protected data block; and
continuing, based at least in part upon said offset value and said intermediate error checking result, with an error checking calculation.

11. A system comprising:
a circuit card comprising circuitry coupled to a bus, said circuitry being capable of, at least one of transmitting and receiving a first portion of a first protected data block within a first frame, and at least one of transmitting and receiving a second portion of said first protected data block within a second frame, wherein said circuitry is capable of calculating an intermediate error checking result in response to data in said first portion of said first protected data block, and said circuitry further being capable of storing said intermediate error checking result in memory and retrieving said intermediate error checking result at a start of said second frame.

12. The system of claim 11, further comprising:
a circuit board comprising said bus and a bus interface slot, said circuit card being capable of being coupled to said bus interface slot.

13. The system of claim 12, wherein said circuit card is capable of communicating with at least one device using a communication protocol.

14. The system of claim 13, wherein said at least one device comprises one or more mass storage devices.

15. The system of claim 14, wherein said one or more mass storage devices comprise a redundant array of independent disks (RAID).

16. The system of claim 11, wherein said first and second frame are in accordance with one of Serial Attached Small Computer System Interface (SAS) protocol and Fibre Channel protocol.

17. A method comprising:
receiving a plurality of sequentially transmitted frames comprising a first and second frame, a first portion of a first protected data block being within said first frame and a second portion of said first protected data block being within said second frame, and at least one of said sequentially transmitted frames is received out of order; and
analyzing a second protected data block of said at least one out of order frame for an error if said second protected data block starts concurrently with said at least one out of order frame.

18. The method of claim 17, wherein said analyzing comprises calculating at least an intermediate error checking result for said second protected data block.

19. A partial block communication circuit comprising:
receive circuitry to receive a first portion of a first protected data block within a first frame and to receive a second portion of said first protected data block within a second frame, wherein said circuitry is further capable of calculating an intermediate error checking result based on data in said first portion of said first protected data block, saving said intermediate error checking result, and retrieving said intermediate error checking result at the start of said second frame.

20. An apparatus comprising:
circuitry capable of at least one of transmitting and receiving a first portion of a first protected data block within a first frame, and at least one of transmitting and receiving a second portion of said first protected data block within a second frame, wherein said circuitry is further capable of calculating an intermediate error checking result based on data in said first portion of said first protected data block, saving said intermediate error checking result, and retrieving said intermediate error checking result at the start of said second frame.

21. The apparatus of claim 20, wherein said first and second frame are in accordance with one of Serial Attached Small Computer System Interface (SAS) protocol and Fibre Channel protocol.

22. The apparatus of claim 20, wherein said second portion comprises a remaining portion of said first protected block.

23. The apparatus of claim 22, wherein said circuitry is further capable of calculating a final error checking result in response to, at least in part, said intermediate checking result and data in said remaining portion.

24. The apparatus of claim 20, wherein said circuitry is further capable of saving an offset value representative of a last data bit of said first portion of said first protected data block; and continuing, based at least in part upon said offset value and said intermediate error checking result, with an error checking calculation.

* * * * *